Patented July 14, 1931

1,814,721

UNITED STATES PATENT OFFICE

JOHN WESLEY MARDEN, OF EAST ORANGE, NEW JERSEY, ASSIGNOR TO WESTINGHOUSE LAMP COMPANY, A CORPORATION OF PENNSYLVANIA

PREPARATION OF DUCTILE URANIUM

No Drawing.    Application filed January 13, 1925. Serial No. 2,158.

This invention relates to the preparation of such metals as uranium, thorium, and the like, usually referred to as the rare or refractory metals, in ductile form, and more particularly, to the preparation of ductile uranium.

In copending applications Serial Nos. 432,325, filed December 21, 1920; 618,544, filed February 12, 1923; and 717,940, filed June 5, 1924, Marden et al. and U. S. Patent No. 1,437,984, issued December 5, 1922, Marden, all assigned to the present assignee, processes for the preparation of the rare metals in the ductile and coherent form have been described. These processes have been found to be eminently satisfactory for this purpose.

The present invention contemplates particularly the preparation of uranium in ductile form although it is useful for the preparation of other rare metals. The process comprises principally a combination of two prior processes described in several copending applications assigned to the present assignee and more fully referred to hereinafter.

One of these processes involves the preparation of a double salt of a rare metal, particularly uranium, in a high state of purity. This process is fully described in copending application Serial No. 699,942, filed March 17, 1924, Marden et al., assigned to the same assignee as the present invention. The present invention utilizes only that part of the process described in application Serial No. 699,942, relating to the preparation of the potassium-uranium fluoride or a salt of uranium which does not contain oxygen or which will not be altered upon exposure to the atmosphere.

Halide salts of the rare metals heretofore prepared, have been made by distillation, with extreme care, in moisture free or oxygen free environments. Such salts, however, cannot be handled in the atmosphere without contamination and so far as the applicant is aware, uranium chloride or potassium-uranium chloride or the corresponding sodium salt have never been made in the oxygen free condition. Salts prepared by the prior processes cannot be handled in charging a bomb nor can they be exposed to the atmosphere without oxidation of the final product. According to the present invention, these difficulties are entirely avoided by the preparation and utilization of stable salts of the rare metals.

According to the present invention, for example, an oxide free salt of uranium, or a salt that will not become contaminated upon exposure to the air, may be obtained by dissolving uranyl acetate in distilled water. To this solution is added a solution containing a suitable quantity of potassium fluoride, sodium fluoride, or the like. The two solutions are thoroughly mixed and to the mixture of uranyl and potassium or sodium fluoride, a suitable quantity of hydro-fluoric acid and formic acid or other desirable reducing agent, are added. The solution will be found to be of a clear yellow color. The reaction is effected by exposing the solution to the action of sunlight. Such exposure should be continued until the reaction is complete, at which time the solution becomes quite colorless and substantially all of the uranium salts are precipitated in the form of a fine, crystalline, bright-green color precipitate. The reaction which takes place may be represented by the following equation:

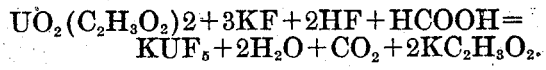
$$UO_2(C_2H_3O_2)_2 + 3KF + 2HF + HCOOH = KUF_5 + 2H_2O + CO_2 + 2KC_2H_3O_2.$$

The precipitate may be removed from the solution by filtering and thereafter thoroughly washed with distilled water to remove the soluble products mixed with the precipitate. The precipitate may be then dried by heating in an oven.

The water of crystallization in the precipitate may be removed therefrom by fusing the recipitate mixed with an equal weight of sodium and potassium chlorides. The fusion may be accomplished by heating a platinum crucible containing the materials in air over an open flame, in an electric furnace or in an inert environment, such as hydrogen. The sodium and potassium chlorides may be placed in the crucible of platinum and the potassium-uranium fluoide added a little at a time, until the fusion is perfectly clear. The crucible may then be covered and the fused mass allowed to cool.

When cool, the fused mass is removed from the crucible and ground to pass a 200 mesh sieve after which the powder may be suspended in distilled water to remove all of the excess of sodium and potassium salts. The residue may be filtered, washed with alcohol and thereafter dried for approximately one hour at 150° C. in a drying oven.

The foregoing process when carefully followed, will result in the production of a potassium-uranium salt which is free from oxide contamination and which is so coarse that it may be readily filtered without clogging the pores of the filter.

The potassium-uranium fluoride thus prepared is reduced in a manner corresponding to that more fully described in copending applications Serial Nos. 618,544 and 717,940 assigned to the same assignee as the present application.

According to the process therein described, a pure oxide of a rare metal is reduced by means of calcium in the presence of a fluxing agent, such as calcium chloride, the reaction being practiced in an iron bomb. In place of the oxide of the rare metals, the present invention contemplates the use of the double salt of the rare metal prepared in the manner previously described.

The reduction of the potassium-uranium fluoride, for example, comprises the formation of a charge for the bomb by mixing 130 grams of potassium uranium fluoride, 75 grams of calcium and 100 grams of calcium chloride. This charge may be formed into cakes as described in copending application Serial No. 618,544 and placed in an iron bomb of the type described in application Serial No. 717,940, or may be poured directly from the mixing vessel into the bomb. Calcium cuttings may be placed on top of the charge and the bomb hermetically sealed. The bomb is heated, preferably in an electric furnace to about 950° C. to effect the reaction. After the reaction has gone to completion, the bomb is removed from the furnace and allowed to cool to room temperature. The charge may then be removed and the uranium recovered by washing and disintegration in a large volume of distilled water. Several washings are resorted to, after which the powder is removed and placed in distilled water to which is added concentrated nitric acid. The acid washing may be repeated as often as necessary, or until gaseous evolution ceases. The acid may be removed by further washing with distilled water, after which the powder may be dried.

The dried powder may be pressed into cakes and heated in a high vacuum or inert environment in an induction furnace of the type described in Patent No. 1,480,301. Any calcium fluoride mixed with the powder may thus be distilled away, the uranium remaining behind in the form of powder and segregations. These segregations and powder may be further heat treated in a high vacuum or inert environment in the manner set forth in copending application Serial No. 717,940, heretofore mentioned, to obtain a coherent mass of uranium which is ductile throughout. If desired the segregation may be directly used and rolled, hammered or otherwise worked into such forms as wires, filaments, etc.

Uranium prepared by carefully following the above process will be found to be ductile, even when cold.

The coarseness of the uranium powder may be regulated by controlling the amount of calcium chloride used in the bomb reaction. The calcium chloride may be employed only for this purpose as the speed of the reaction may be carefully controlled by increasing or decreasing the amount of the calcium chloride used, thus furnishing a very effective means of controlling the particle size of the resultant powder.

From the foregoing it will be appreciated that the invention resides in the preparation and utilization of a halide salt of a rare metal which does not contain oxygen or combine with oxygen upon exposure to the air, and the reduction of the salt by calcium in a closed bomb, the speed of the reaction being controlled by regulation of the amount of calcium chloride added to the charge in the bomb, whereby a grade of powder may be obtained which is coarse enough not to take fire spontaneously, but fine enough to be pressed into form so as to facilitate handling and heat treatment of the same to obtain coherent, pure, ductile metal.

Uranium metal obtained by practicing the foregoing process has been drawn into wire of small sizes, suitable for filaments, cathodes and the like, and is extremely ductile.

Modifications of the foregoing process may suggest themselves to those skilled in the art, but such as come within the scope of the appended claims are considered as falling within the spirit of the present invention.

What is claimed is:

1. The process of preparing rare metal powders of predetermined particle size which comprises reducing a salt of a rare metal by means of calcium in the presence of a predetermined amount of calcium chloride.

2. The process of preparing rare metal powders of predetermined particle size which comprises reducing a compound of a rare metal by means of a reducing agent in the presence of a fluxing agent and controlling the speed of the reaction by varying the amount of fluxing agent.

3. The process of preparing a rare metal powder of predetermined particle size which comprises reducing a double salt of a rare metal by means of calcium while excluding the atmosphere and controlling the speed of the reaction by the addition of a predetermined quantity of calcium chloride.

4. The process of preparing a rare metal powder of predetermined particle size which comprises reducing a purified double salt of a rare metal by calcium while excluding the atmosphere and regulating the speed of the reaction by the addition of variable quantities of calcium chloride.

5. The process of preparing a rare metal powder of predetermine particle size which comprises reducing a double salt of a rare metal by means of a reducing agent away from the atmosphere and regulating the speed of the reaction by adding variable amounts of calcium chloride.

6. The method of preparing uranium of predetermined particle size which comprises reducing potassium-uranium fluoride by means of calcium in the presence of calcium chloride and regulating the speed of the reaction by varying the amount of calcium chloride.

7. The method of preparing uranium powder of a degree of coarseness that it may be pressed into form without spontaneously taking fire, which comprises reducing potassium-uranium fluoride by means of calcium in the presence of a predetermined quantity of calcium chloride.

8. The method of preparing ductile uranium which comprises reducing a salt of uranium by means of calcium in the presence of calcium chloride, extracting the uranium powder and heat-treating the same in a high vacuum until the particles are sintered into a homogeneous ductile mass.

9. The method of preparing ductile uranium which comprises reducing a double salt of uranium by means of calcium in the presence of calcium chloride, extracting resultant powder and heat-treating the same in an inert environment until the uranium is obtained in a homogeneous ductile form.

10. The method of preparing ductile uranium which comprises reducing potassium-uranium fluoride by means of calcium in the presence of calcium chloride away from the atmosphere, extracting the powder, pressing the powder to form and heat-treating in an inert environment until homogeneous and ductile.

11. The method of preparing uranium which comprises the preparation of a stable halide of uranium and reducing said halide by means of calcium in the presence of calcium chloride.

12. The method of preparing uranium which comprises the preparation of a stable halide of uranium and reducing said halide by calcium in the presence of calcium chloride, said reduction being practiced away from the atmosphere.

In testimony whereof, I have hereunto subscribed my name this 12th day of January, 1925.

JOHN WESLEY MARDEN.